United States Patent
Mielke et al.

(10) Patent No.: US 7,784,180 B2
(45) Date of Patent: Aug. 31, 2010

(54) METHOD AND BLADE REPAIR ELEMENT FOR BLISK REPAIR OR NEW BLISK MANUFACTURE

(75) Inventors: Rainer Mielke, Oberursel (DE); Erik Johann, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 1289 days.

(21) Appl. No.: 11/168,398

(22) Filed: Jun. 29, 2005

(65) Prior Publication Data

US 2006/0239823 A1 Oct. 26, 2006

(30) Foreign Application Priority Data

Jun. 30, 2004 (DE) .................... 10 2004 032 461

(51) Int. Cl.
*B23P 6/00* (2006.01)
(52) U.S. Cl. .................. 29/889.1; 29/889.2; 29/889.7; 416/223 R; 416/224
(58) Field of Classification Search ............ 29/889.1, 29/889.2, 889.21, 889.23, 889.7, 888.025, 29/402.03, 402.08, 402.09, 402.13, 402.12, 29/402.16; 416/213 R, 223 R, 224
See application file for complete search history.

(56) References Cited

U.S. PATENT DOCUMENTS

| | | | | |
|---|---|---|---|---|
| 3,600,934 | A | * | 8/1971 | Hendrix et al. ............... 73/570 |
| 4,864,706 | A | * | 9/1989 | Jenkel ..................... 29/889.21 |
| 4,883,216 | A | * | 11/1989 | Patsfall ....................... 228/119 |
| 4,934,583 | A | | 6/1990 | Patsfall |
| 5,197,190 | A | * | 3/1993 | Coolidge ................... 29/889.1 |
| 5,383,593 | A | * | 1/1995 | Lechervy et al. ............ 228/182 |
| 5,479,704 | A | | 1/1996 | Richter |
| 5,551,623 | A | * | 9/1996 | Collot et al. ............. 228/112.1 |
| 5,755,031 | A | * | 5/1998 | Baumgarten et al. ....... 29/889.1 |
| 5,865,364 | A | * | 2/1999 | Trask et al. ................. 228/212 |
| 6,438,838 | B1 | | 8/2002 | Meier |
| 6,524,072 | B1 | * | 2/2003 | Brownell et al. ........ 416/213 R |
| 6,568,077 | B1 | | 5/2003 | Hellemann et al. |
| 7,125,227 | B2 | * | 10/2006 | Adde et al. ............. 416/213 R |
| 2002/0127108 | A1 | * | 9/2002 | Crall et al. .............. 416/213 R |

FOREIGN PATENT DOCUMENTS

| | | |
|---|---|---|
| DE | 3909733 A1 | 10/1989 |
| DE | 69500234 T2 | 4/1997 |
| DE | 19831736 C2 | 5/2000 |

(Continued)

*Primary Examiner*—David P Bryant
*Assistant Examiner*—Ryan J Walters
(74) *Attorney, Agent, or Firm*—Timothy J. Klima; Shuttleworth & Ingersoll, PLC

(57) ABSTRACT

In the repair of a blisk or blisk drum, the damaged airfoils are completely cut off a low-stress nodal line of the respective blade, except for a blade stump (2), and are each replaced by a new blade repair element (3) of a same shape and size which is accurately clamped onto the blade root by a ledge (5) formed onto its mating end, with this ledge (5) also serving for fixation of the processing fixtures and stabilization of the thin airfoil, and is then welded to the blade root and subsequently subjected to a cutting or non-cutting operation for removal of the ledge (5). This highly efficient repair method can similarly also be applied to the new manufacture of blisks.

7 Claims, 2 Drawing Sheets

FOREIGN PATENT DOCUMENTS

| | | |
|---|---|---|
| EP | 0376874 B1 | 7/1990 |
| EP | 0 511 022 A1 | 10/1992 |
| EP | 0 596 796 A1 | 5/1994 |
| EP | 0 638 387 A1 | 8/1994 |
| EP | 1 138 431 A2 | 10/2001 |
| EP | 1239116 A2 | 9/2002 |
| GB | 2274418 A | 7/1994 |

* cited by examiner

METHOD AND BLADE REPAIR ELEMENT FOR BLISK REPAIR OR NEW BLISK MANUFACTURE This application claims priority to German Patent Application DE102004032461.1 filed Jun. 30, 2004, the entirety of which is incorporated by reference herein.

BACKGROUND OF THE INVENTION

This invention relates to a method for the repair of blisks in which the damaged blade section is removed and replaced by a new blade portion of corresponding shape and size by welding, and to a blade repair element for the performance of the method. Moreover, the present invention relates to the new manufacture of blisks.

The compressors of aircraft engines are, in many cases, designed in blisk technology, with the rotor blades being integral with the rotor disk. In comparison with compressors whose blades are separately manufactured and separably attached to the rotor disk, the one-piece blisks are advantageous in that they are capable of withstanding higher mechanical loads. This has positive consequences, for example on the weight and the performance of the engine.

The compressor blades of aircraft engines are, as is generally known, subject to considerable erosion in the area of the tip edge and—if the sand particle content of the air is high—also in a zone reaching from the tip edge to the trailing edge. Moreover, the blade leading edge, in particular, is liable to damage by larger objects, but also by small stones. If the rotor blades are manufactured separately and attached separably to the rotor disk, the damaged or worn blades can relatively easily be replaced by new ones. This advantageous, but expensive, approach is not possible with compressors in blisk technology as their rotor blades are one piece with the rotor disk.

In a method for the repair of damaged blisks known from U.S. Pat. No. 6,568,077, a certain area of the leading or trailing edge of the damaged rotor blades is cut off in dependence of previously determined stress lines in such a manner that the cutout is clear of the areas of maximum stress in the blade. Subsequently, the recess is re-filled with several weld passes in a suitable welding process and machined. According to yet another feature of this method, an individually pre-manufactured insert, whose shape and size correspond to the cutout, can first be tack-welded to or located by suitable fixtures in the right position on the edge of the cutout, and subsequently be firmly joined to the blade in a welding process. The repair of blisks by cutting off and either subsequent multi-pass welding or individual manufacture of the corresponding insert and correct manual positioning and fixation of the latter in the limited space available between the blades incurs considerable effort. Quality defects in blisk repair can, therefore, not be excluded. In addition, the effort for technical assessment of the quality of the repaired blades or blisks is high.

BRIEF SUMMARY OF THE INVENTION

In a broad aspect, the present invention provides for a reduction of the work effort and costs for blisk repair, and for an appropriate method and means for the performance of this method, with this method also being applicable to the new manufacture of blisks.

It is a particular object of the present invention to provide solution to the above problems by a method in accordance with the features described herein, as well as a blade repair element designed in accordance with the features described herein for the performance of the method. Further advantageous embodiments and useful developments of the present invention become apparent from the description below.

The essential idea of the present invention is that the damaged airfoils are completely cut off above the blade root with the exception of a stump, actually in a specific, vibration-free or low-vibration area along a nodal line determined beforehand for the respective type of blade. The known size of the removed blade section will be used for the pre-manufacture of standardized blade repair elements, these comprising a new blade portion of the shape and size known from the removed blade section which is one piece with a fixation means provided at the side of the new blade portion intended for attachment to the free end face of the blade stump. By means of this fixation means, the new blade portion is accurately positioned and clamped on the blade root under formation of a welding gap, and then machine-welded to the blade root. Subsequently, the integral fixation means is removed in a cutting or non-cutting process.

The use of pre-manufactured, standardized blade repair elements that can easily be clamped in position, provides for the efficiency and inexpensiveness of the proposed repair method, while the standardized pre-manufacture of these elements, as well as the production of the joint in the vibration-free nodal line, ensure the longevity of the repaired blisk or blisk drum. Owing to the stiffening function of the fixation means, the thin-walled airfoil will be stressed mechanically to only an insignificant extent during machining. For the above reasons, the inspection effort after blisk repair will also be considerably lower for the present method than for other known methods.

Similarly, the above repair method can efficiently be applied to the new manufacture of single or multi-stage blisks in that disks with integral blade stumps are initially produced such that their faying end face lies in the area of a vibration-free nodal line of the entire airfoil. Subsequently, these blade stumps are joined, in the above manner, to the standardized, pre-manufactured blade (repair) elements, which can equally be used for blade repair.

The blade repair elements (or the similarly designed blade assembly elements for blisk new manufacture) consist of a new blade portion that is identical in shape and size with the cut off (or still missing) blade section, and form one part with a rigid ledge provided for fixation and stabilization at that side of the new blade portion that is to be joined to the blade stump. This ledge holds the new blade portion positively and accurately in position on the blade stump during subsequent processing by welding and milling, enabling machining to be performed.

BRIEF DESCRIPTION OF THE DRAWINGS

The present invention is more fully described in the light of the accompanying drawings showing a preferred embodiment. In the drawings.

DETAILED DESCRIPTION OF THE INVENTION

Figure 1:
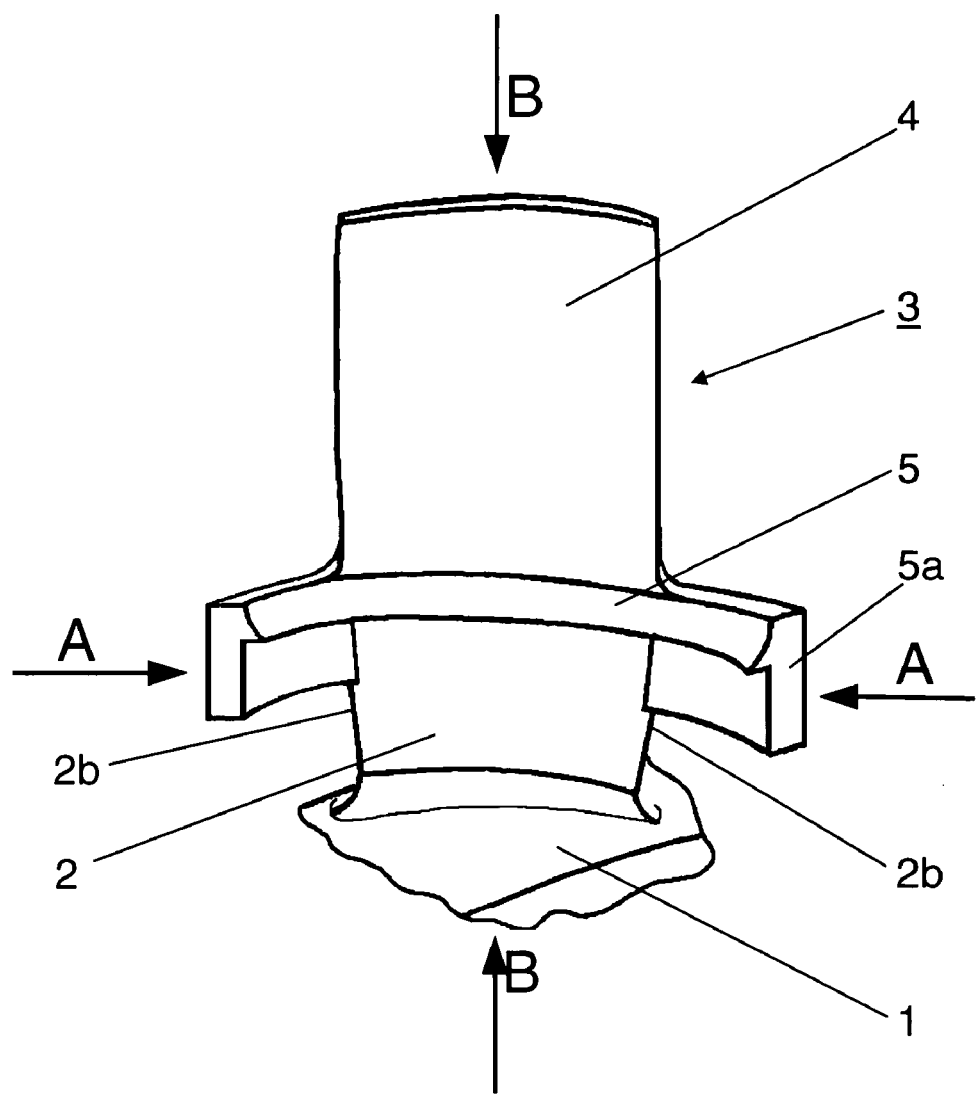
FIG. 1 is a perspective representation of a blade repair element fitted to a blade stump of a blisk.
Figure 2:
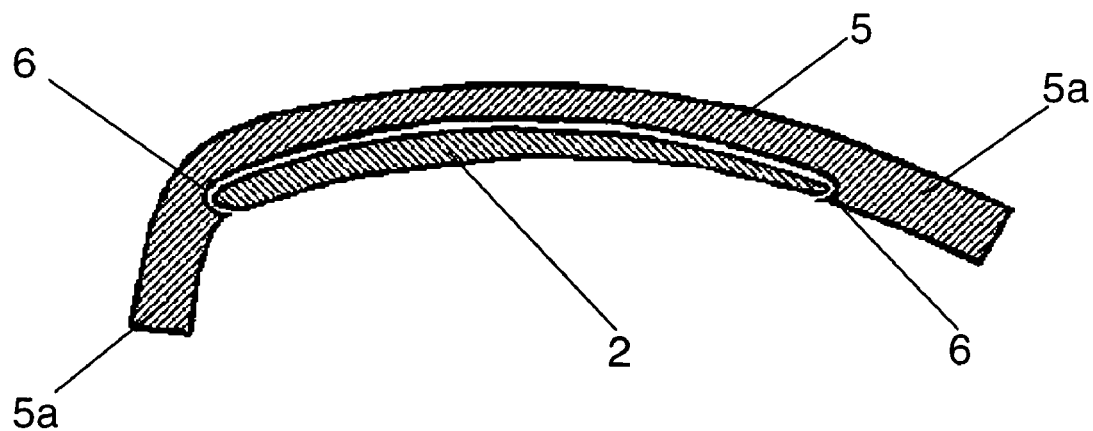
FIG. 2 is a sectional view along line AA in FIG. 1.
Figure 3:
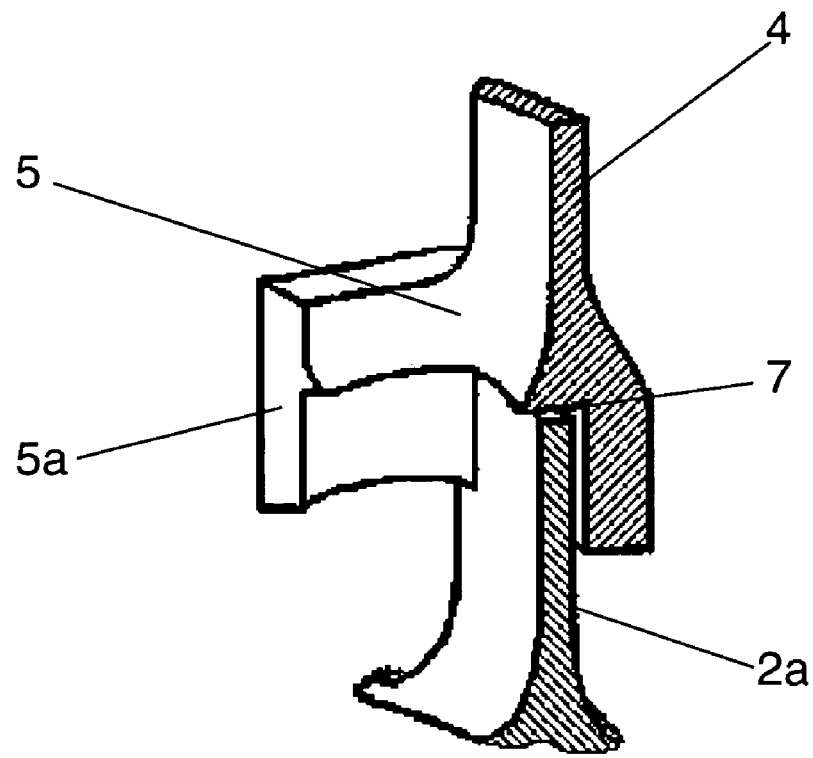
FIG. 3 is a sectional view along line BB in FIG. 1.

In accordance with the present repair method, the worn or damaged blade sections of a single or multi-stage blisk used, for example, in a compressor, are cut off over the entire width of the blade such that a blade stump 2 is left on the disk 1 of the blisk, this stump forming one piece with the disk. Beforehand, vibration investigations are performed on the blades allocated to the respective compressor stage to determine the minimum vibration area across the blade width for the respective blade type. It was found that the nodal lines for low vibrations and, thus, low material stress extend, among others, in an area located slightly above the blade root and extending essentially over the entire blade width. This is exactly the area where the damaged blade is cut off and the free edge of the blade stump 2 left for subsequent welding is located. Obviously, the height of the stump can vary on a multi-stage blisk (blisk drum) with different blades in the individual stages. It is also contemplated that the cutting plane on a blade, in particular on long blades, can be located at different heights on the blade, relative to the blade root, depending on the degree of damage, but the cutting plane will always be located in a low-vibration area.

Upon separation of the damaged upper blade section at always the same blade area on identical blades, a standardized blade repair element 3, which corresponds to the blades of the respective compressor stage, is fitted to the respective blade stumps 2. The respective repair blade element 3 is designed such that it can be clamped onto the pertinent stump 2 without additional tooling and accurately positioned and fixed for subsequent welding. The blade repair element 3 is detailed further below. In the welding gap 7 existing between the cutting face of the blade stump 2 and the mating end face of the blade repair element 3, a weld seam is produced by laser welding which firmly joins the blade repair element 3 to the blade stump 2. The newly built-up blade will then be subjected to a machining process. Since the weld seam extends along a line with low vibration level, the joint will be stressed to a small degree only. Therefore, there is no hazard of damage to the repaired blade in this actually weakest blade area. For this reason, the present method, in analogically modified form, can equally and advantageously also be applied to the new manufacture of blisks.

Figure 4:
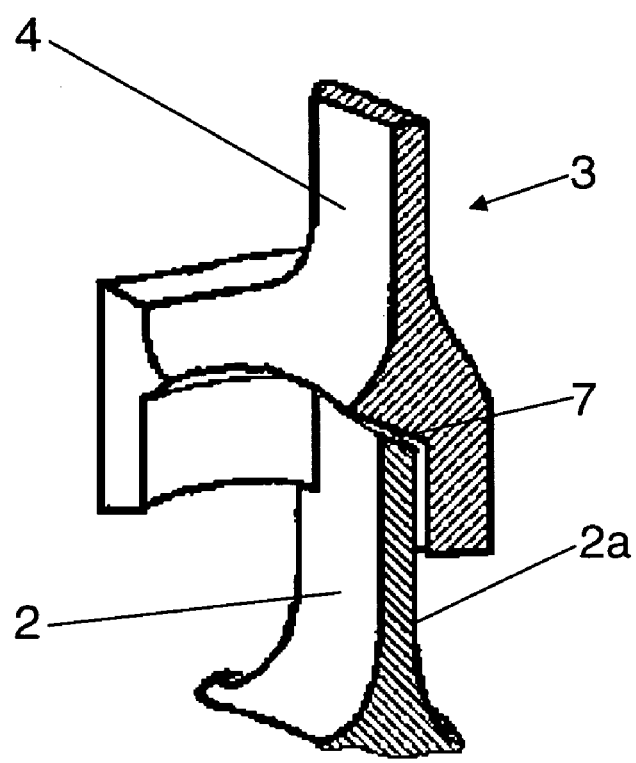
FIG. 4 is a view according to FIG. 3, but with angular weld.

The blade repair element 3 includes the new blade upper portion 4, whose shape and size matches the damaged blade section to be cut off and replaced, and a ledge 5 as repair aid which locates on the rear 2a of the blade stump 2 and laterally extends beyond the longitudinal sides of the new blade upper portion 4. At the level of each longitudinal side 2b of the blade stump 2, the ledge 5 is provided with a recess 6 which embraces the blade stump 2 at its longitudinal sides 2b. By means of the ledge 5 locating on the rear 2a of the blade stump 2 and partly embracing its longitudinal sides 2b, the new blade upper portion 4 is accurately positioned and fixed to the blade stump 2 via its end face. The rigidly designed ledge 5 serves to stabilize the thin, new blade upper portion 4 during subsequent machining, while the laterally protruding, free retaining projections 5a of the ledge 5 are provided for fixation in the respective processing fixture (welding, milling), thus considerably reducing the fixturing, assembly and disassembly effort. A further important function of the retaining projections 5a is the protection of both, the preceding blade row and the adjacent blades during laser welding in that the retaining projections 5a shield the adjacent blades against the detrimental effects of entering and exiting laser radiation. In addition, the multiple functions of the retaining projections 5a contributes to defect minimization since shielding cannot be forgotten. The mating surface at the end faces intended for the production of the weld joint or the formation of the welding gap, respectively, can be straight or, as shown in FIG. 4, inclined. The angular arrangement of the welding gap 7 facilitates the access to the welding gap during laser welding on a blisk drum whose blades or blade stages are closely spaced. After joining the blade repair element 3 to the blade stump 2, the ledge 5 is removed in a cutting or non-cutting process (milling operation).

LIST OF REFERENCE NUMERALS

1 Disk
2 Blade stump
2a Rear of blade stump 2
2b Longitudinal sides of blade stump 2
3 Blade repair element
4 New blade upper portion
5 Ledge
5a Free retaining projections of ledge 5
6 Recesses in ledge 5
7 Welding gap

What is claimed is:

1. A method for the repair of a blisk in which a damaged section of a blade is removed and replaced by a replacement blade portion of corresponding shape and size by welding, comprising:
   cutting off the damaged section of the blade over an entire blade width in an area along a nodal line of low vibration of the blade existing above a blade root, while retaining a blade stump attached to the blisk;
   providing a blade repair element having the replacement blade portion and an integral fixation portion formed onto a joining end of the blade repair element, the integral fixation portion having a recess that axially receives a portion of the blade stump and thereby embraces longitudinal sides of the blade stump to independently and accurately position the replacement blade portion with respect to the blade stump, wherein the integral fixation portion includes a projecting portion extending axially below an entire side of a joining end of the replacement blade portion from leading edge to trailing edge for shielding an adjacent blade from leading edge to trailing edge against detrimental laser radiation while welding the blade repair element to the blade stump, the integral fixation portion also including a recessed portion on an opposite side of the replacement blade portion as the projecting portion, the recessed portion creating an exposed side of a joint between the replacement blade portion and the blade stump when the replacement blade portion is positioned over the blade stump to allow access to the joint from the exposed side;
   engaging the integral fixation portion with the blade stump to independently and accurately position the replacement blade portion with respect to the blade stump;
   clamping the blade repair element on the blade stump while positioned by the integral fixation portion;
   laser welding the blade repair element to the blade stump from the exposed side of the joint via the recessed portion of the integral fixation portion while simultaneously shielding the adjacent blade from the detrimental laser radiation with the projecting portion; and
   subsequently removing the integral fixation portion.

2. A method in accordance with claim 1, wherein the damaged section the of blade is cut off in an area whose distance to the blade root depends on a length of the blade, with a longer blade being cut off further away from the blade root.

3. A method in accordance with claim 2, wherein the blade repair element and blade stump include like inclined weld joining surfaces to produce an inclined welding gap facilitating deposition of weld filler.

4. A method in accordance with claim 3, wherein the projecting portion also assists in providing positive fixation of the blade repair element to the blade stump.

5. A method in accordance with claim 1, wherein the blade repair element and blade stump include like inclined weld joining surfaces to produce au inclined welding gap facilitating deposition of weld filler.

6. A method in accordance with claim 1, where the nodal line of low vibration is determined by subjecting the blade to a vibration test.

7. A method in accordance with claim 1, wherein the projecting portion also assists in providing positive fixation of the blade repair element to the blade stump.

* * * * *